United States Patent Office 3,845,210
Patented Oct. 29, 1974

3,845,210
SOLID COMPOSITION COMPRISING INDOLYL-ALIPHATIC ACID DERIVATIVES FOR FORMING AN INJECTION
Nobuyasu Sato, 45 Kasugaoka 1-chome, Itami-shi, Japan; and Toshio Nakamura, 7–10 Namikicho; and Hiroshi Takenaka, 2–1 Kuwatacho, both of Ibaragi-shi, Japan; and Yutaka Mito, 13–5 Oloshimotomachi, Neyagawashi, Japan
No Drawing. Continuation of abandoned application Ser. No. 819,937, Apr. 28, 1969. This application Nov. 27, 1972, Ser. No. 309,741
Int. Cl. A61k 27/00
U.S. Cl. 424—266                                      3 Claims

ABSTRACT OF THE DISCLOSURE

A stable solid composition of an indolylaliphatic acid derivative excellent in resolubility, which is obtained by subjecting to lyophilization a solution containing an alkali metal salt of an indolylaliphatic acid derivative, at least one organic amine having pKa value of 8–11 and capable of being used as one of the components of an injection selected from the group consisting of ethylene diamine, alkanol amines and basic amino acids in an amount at which no pharmaceutical effect is displayed, a bulk increaser and water.

---

This is a continuation of application Ser. No. 819,937, filed Apr. 28, 1969, now abandoned.

This invention relates to a solid composition of indolylaliphatic acid derivative and to a process for producing same. More particularly, it pertains to a stable solid composition of indolylaliphatic acid derivative represented by the general formula,

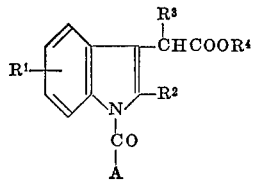

wherein $R^1$ represents a lower alkyl group having 1 to 3 carbon atoms, a lower alkoxy group having 1 to 2 carbon atoms, a hydrogen atom or a halogen atom; $R^2$ represents a lower alkyl group having 1 to 3 carbon atoms; $R^3$ represents a hydrogen atom or a lower alkyl group having 1 to 3 carbon atoms; $R^4$ represents an alkali metal atom; and A represents a phenyl group, a halogen substituted phenyl group, a styryl group or a pyridyl group, and to a process for producing same.

The indolylaliphatic acid derivatives used in the present invention are known as non-steroidal antirheumatics having strong anti - inflammatory-, analgesic and antipyretic properties.

Some of the indolylaliphatic acid derivatives, when administrated orally, produce gastroenteric troubles. Moreover, oral administration thereof hardly shows satisfactory pharmacological effects. Therefore, parenteral administration as an injection provides a very advantageous means for administration.

However, not only are indolylaliphatic acid derivatives with weak acidity of about pKa 4 extremely low in solubility in water, but also they are hydrolyzed due to the first order reaction by an acidic or basic catalyst. Therefore, it would be considered that the production of a solid composition thereof by the lyophilization process would be desirable. It is however difficult to prepare a resoluble solid composition by such process, because soluble salts of indolylaliphatic acid derivatives tend to lose their resolubility by such physical treatment as an ordinary lyophilization operation, thereby forming precipitates or the like.

Generally, it has been known that resolubility can be improved by addition of a buffer agent composed of an inorganic ion. In the case of the indolylaliphatic acid derivatives of the present invention, however, the use of a buffer agent composed of an inorganic ion brings about the lowering of pharmaceutical effect due to hydrolysis of an acyl group of the indolylaliphatic acid derivative. Also, it brings about coloration due to oxidative decomposition.

The present inventors studied a process for preparing a solid composition of indolylaliphatic acid derivative, which is stable, excellent in resolubility and reduced in toxicity. As a result, they have found that a solid composition having good resolubility and stability can be obtained by lyophilization of an aqueous solution containing an indolylaliphatic acid, an organic amine, i.e. alkanol amines such as morpholine, choline, ethylenediamine, urotoropin, glucosamine, diethanolamine, triethanolamine or diethylaminoethanol, or a basic amino acid such as histidine, lysine or arginine and a bulk increaser. For this purpose, they have further found that organic amines having a pKa of about 8 to about 11 are suitable for the indolylaliphatic acid derivatives having pKa of about 4. Still further, they have found that, among these organic amines, histidine and lysine of the basic amino acids are particularly excellent.

One of the objects of the present invention is to provide a stable solid composition of an indolylaliphatic acid derivative.

Another object of the present invention is to provide a process for preparing a stable solid composition of an indolylaliphatic acid derivative.

These and other objects of the present invention will become apparent from a consideration of the following specification and claims.

For accomplishing these objects, the present invention provides a solid composition obtained by lyophilizing a solution consisting essentially of an alkali metal salt of an indolylaliphatic acid derivative of the aforesaid formula, an organic amine having pKa 8–11 and capable of being used as one of the components of an injection in an amount at which their pharmaceutical effect as medicines is not displayed, a suitable amount of bulk increaser and water.

The present invention also provides a process for preparing a solid composition of a indolylaliphatic acid derivative of the aforesaid formula, which comprises lyophilizing a solution consisting essentially of an alkali metal salt of an indolylaliphatic acid derivative of the aforesaid formula and the aforesaid organic amine, bulk increaser and water.

In the present invention, examples of the halogen atoms shown by the symbol $R^1$ of the aforesaid formula include a fluorine, chlorine, bromine or iodine atom. Examples of the alkali metal shown by the symbol $R^4$ of the aforesaid formula include lithium, sodium or potassium. Examples of the halogen substituted phenyl group shown by the symbol A of the aforesaid formula include o-, m- or p-chlorophenyl, o-, m- or p-bromophenyl, or o-, m- or p-iodophenyl.

Examples of the organic amine used in the present invention include morpholine, choline, ethylenediamine, urotropin, glucosamine, alkanolamine such as ethanolamine, diethanolamine, triethanolamine, 2 - dimethylaminoethanol and 2 - diethylaminoethanol, basic amino acids such as histidine, lysine and arginine or the like, among which a basic amino acid is preferable.

Examples of the bulk increaser used in the present invention include mannite, glucose, dextrose, sodium chloride, glycine, sodium glutamate or the like.

In the present invention, the amount of the organic amine to be used is 5–50% by weight, preferably about 10 to about 20% by weight based on the alkali metal salt of the indolylaliphatic acid derivative. Furthermore, the organic amine may be used singly or in a mixture of two or more kinds.

The amount of the bulk increaser used in the present invention is not particularly limited and may be the same amount as in the case of preparing a solid composition according to an ordinary lyophilization process. In general the amount of the bulk increaser is about 5–10 times by weight of the alkali metal salt of the indolylaliphatic acid derivative.

In the present invention, other medicaments having anti-pyretic and analgesic actions, i.e. aminopyrine, sulpyrine, phenylbutazone, sodium salicylate and caffeine may be contained simultaneously with the indolylaliphatic acid derivative.

The lyophilization process of the present invention is the same as ordinary ones that are used for the preparation of solid cmposition, for example, the lyophilization process employed in the present invention is carried out at a temperature from —20° to —40° C.; under a pressure from $10^{-1}$ to $10^{-3}$ mm Hg; for a period from 5 to 24 hours.

In the present invention, when a water insoluble free indolylaliphatic acid derivative is used as the starting material in place of a salt of indolylaliphatic acid derivative, said free acid is dissolved in an aqueous alcohol such as aqueous ethanol and the resultant alcoholic solution is heated with addition of alkali carbonate or bicarbonate. The alcohol is removed therefrom during the course of heating and the remaining alcohol, if any, does not cause any trouble.

The solid composition obtained by the process of the present invention is redissolved in a suitable amount of water for injection and then the resultant injection liquid is used for administration.

It should thus be understood that the point of importance of the present invention resides in the use of the organic amine in the lyophilization process. The solid injection of indolylaliphatic acid derivative can become stable and have good resolubility only by the employment of the organic amine.

The following Table shows the results of storage tests carried out on the solid compositions obtained by the process of the present invention. Each solid composition was obtained by diluting 10 g. each of sodium salts of various indolylaliphatic acid derivatives, 1 g. each of various organic amines and 90 g. each of mannite with water and filtering the resultant aqueous solution, and further adding 10 g. each of antipyretic-analgesic agents to some of the obtained filtrate, and then lyophilizing the obtained mixture. Furthermore, in said Table the values of "residual indolylaliphatic acid derivative" means the ratio of the amount of the indolylaliphatic acid derivative after the storage to the amount before the storage; a (—) mark means that the indolylaliphatic acid derivatives transparently redissolve and a (+) mark means that the indolylaliphatic acid derivatives redissolve incompletely to form a precipitate.

TABLE

| | | Immediately after lyophilization | | After 2-months storage at 50° C. | | After 4-months storage at 50° C. | |
|---|---|---|---|---|---|---|---|
| | Prescription | Residual indolylaliphatic acid derivative | Appearance | Residual indolylaliphatic acid derivative | Appearance | Residual indolylaliphatic acid derivative | Appearance |
| 1 | Sodium 1-(p-chlorobenzoyl)-2-methyl-5-methoxy-3-indolyl acetate, Mannite. | *— | (+) | *— | (+) | *— | (+) |
| 2 | Sodium 1-(p-chlorobenzoyl)-2-methyl-5-methoxy-3-indolylacetate, Histidine, Mannite. | 100% | (—) | 99.0% | (—) | 96.7% | (—) |
| 3 | Sodium 1-(p-chlorobenzoyl)-2-methyl-5-methoxy-3-indolylacetate, Lysine, Mannite. | 100% | (—) | 99.5% | (—) | 95.0% | (+) |
| 4 | Sodium 1-(p-chlorobenzoyl)-2-methyl-5-methoxy-3-indolylacetate, Diethanolamine, Mannite. | 100% | (—) | 95.0% | (—) | 91.0% | (—) |
| 5 | Sodium 1-cinnamoyl-2-methyl-5-methoxy-3-indolylacetate, Histidine, Mannite. | 100% | (—) | 99.5% | (—) | 99.0% | (—) |
| 6 | Sodium 1-nicotinoyl-2-methyl-5-methoxy-3-indolylacetate, Histidine, Mannite. | 100% | (—) | 98.0% | (—) | 95.0% | (—) |
| 7 | Sodium 1-(p-chlorobenzoyl)-2-methyl-5-methoxy-3-indolylacetate, Histidine, Sodium salicylate, Mannite. | 100% | (—) | 99.0% | (—) | 95.1% | (—) |
| 8 | Sodium 1-(p-chlorobenzoyl)-2-methyl-5-methoxy-3-indolylacetate, Histidine, Aminopyrine, Mannite. | 100% | (—) | 98.0% | (—) | 97.0% | (—) |
| 9 | Sodium 1-(p-chlorobenzoyl)-2-methyl-5-methoxy-3-indolylacetate, Histidine, Caffeine, Mannite. | 100% | (—) | 96.2% | (—) | 96.0% | (—) |

*This solid injection did not redissolve in water.

As is clear from the Table, the solid composition of the present invention is extremely stable and very excellent in resolubility even after a long period of storage.

The present invention is explained further in detail with reference to the following examples, but the invention is not to be considered as limited thereto.

EXAMPLE 1

An aqueous solution of 10 g. of sodium 1-(p-chlorobenzoyl)-2-methyl-5-methoxy - 3 - indolylacetate, 1 g. of histidine and 90 g. of mannite and water was filtered. The filtrate was subjected to lyophilization at a temperature of —35° C., under a pressure of $10^{-2}$ mm. Hg for 12 hrs. to produce a solid composition.

EXAMPLE 2

A mixture of 10 g. of 1-(p-chlorobenzoyl)-2-methyl-5-methoxy-3-indolylacetic acid, 2.47 g. of sodium bicarbonate, 90 g. of mannite and 100 ml. of aqueous ethanol (about 70%) was heated and stirred. After completion of the reaction, the ethanol was distilled off and the residue was suitably diluted with water. 1 g. of histidine was added to the dilute solution and the resultant mixture was filtered. The filtrate showed pH 7.7 and it was subjected to a lyophilization similar to that of the Example 1 to obtain a solid composition.

EXAMPLE 3

According to a procedure similar to that in Example 1 except that 1 g. of lysine was used in place of 1 g. of histidine, a solid composition of sodium 1-(p-chlorobenzoyl)-2-methyl-5-methoxy-3-indolylacetate was produced.

EXAMPLE 4

According to a procedure similar to that in Example 1 except that 1 g. of diethanolamine was used in place of 1 g. of histidine, a solid composition of sodium 1-(p-chlorobenzoyl)-2-methyl-5-methoxy-3-indolylacetate was produced.

EXAMPLE 5

According to a procedure similar to that in Example 1 except that 10 g. of sodium 1-cinnamoyl-2-methyl-5-methoxy-3-indolylacetate was used in place of the 10 g. of sodium 1-(p-chlorobenzoyl) - 2 - methyl-5-methoxy-3-indolylacetate, a solid composition was obtained.

EXAMPLE 6

According to a procedure similar to that in Example 1 except that 10 g. of sodium 1-nicotinoyl-2-methyl-5-methoxy-3-indolylacetate was used in place of 10 g. of sodium 1 - (p-chlorobenzoyl)-2-methyl-5-methoxy-3-indolylacetate, a solid composition was produced.

EXAMPLE 7

To the filtrate obtained in Example 1 or 2 was added 10 g. of aminopyrine to give a mixture of pH 7.4. The obtained mixture was subjected to a lyophilization similar to that in Example 1 to prepare two kinds of solid compositions.

EXAMPLE 8

An aqueous solution of 10 g. of potassium 1-(p-chlorobenzoyl)-2-methyl-5-methoxy - 3 - indolylacetate, 1 g. of histidine and 90 g. of mannit and water was filtered. The obtained filtrate was subjected to lyophilization according to the procedure similar to that in Example 1 to prepare a solid composition.

What is claimed is:

1. A solid anti-rheumatic composition for forming an aqueous injection obtained by subjecting to lyophilization a solution consisting essentially of an alkali metal salt of an indolylaliphatic acid derivative of the formula,

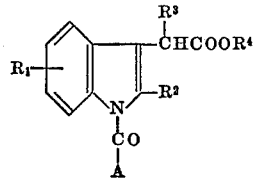

wherein $R^1$ is lower alkyl of 1 to 3 carbons, lower alkoxy of 1 to 2 carbons, hydrogen or halogen, $R^2$ is lower alkyl of 1 to 3 carbons, $R^3$ is hydrogen or lower alkyl of 1 to 3 carbons, $R^4$ is alkali metal, and A is phenyl, halogen substituted phenyl, styryl or pyridyl; an organic amine selected from the group consisting of histidine, lysine and arginine in an amount of 5–50 percent by weight based on the alkali metal salt of the indolylaliphatic acid derivative; a bulk increaser selected from the group consisting of mannite, glucose, dextrose, sodium chloride, glycine and sodium glutamate in an amount of about 5–10 times by weight of the alkali metal salt of the indolylaliphatic acid derivative and water.

2. The composition of Claim 1, wherein the indolylaliphatic acid derivative is 1-(p-chlorobenzoyl)-2-methyl-5-methoxy-3-indolylacetic acid, 1-nicotinoyl-2-methyl-5-methoxy13-indolylacetic acid or 1 - cinnamoyl-2-methyl-5-methoxy-3-indolylacetic acid.

3. The composition of Claim 1, wherein the amount of the organic amine is 10–20% by weight based on the alkali metal salt of the indolylaliphatic acid derivative.

References Cited

UNITED STATES PATENTS

| | | | |
|---|---|---|---|
| 2,433,765 | 12/1947 | Krantz et al. | 424—319 |
| 3,454,593 | 7/1969 | Gal et al. | 424—274 |
| 3,557,280 | 1/1971 | Weber et al. | 424—80 |

OTHER REFERENCES

*The Pharmaceutical Journal* 24, March 1962, p. 254.

*Remington's Pharmaceutical Sciences*, Mack Pub. Co., Easton, Pa. 1965, pp. 180–181.

*Chemical Abstracts*, vol. 64 (1966) 17555.

FREDERICK E. WADDELL, Primary Examiner

U.S. Cl. X.R.

424—263, 274

UNITED STATES PATENT OFFICE
CERTIFICATE OF CORRECTION

Patent No. 3,845,210        Dated October 29, 1974

Inventor(s) Nobuyasu SATO, et al.

It is certified that error appears in the above-identified patent and that said Letters Patent are hereby corrected as shown below:

The Assignee and claim for Convention priority are missing and should be inserted as follows:

Assignee: Sumitomo Chemical Company, Limited
               of Osaka, Japan

Foreign Application Priority Data:
           May 9, 1968.......Japan......31275/68

Signed and Sealed this fifth Day of August 1975

[SEAL]

Attest:

RUTH C. MASON
*Attesting Officer*

C. MARSHALL DANN
*Commissioner of Patents and Trademarks*